United States Patent [19]

Ogasawara et al.

[11] Patent Number: 4,809,654
[45] Date of Patent: Mar. 7, 1989

[54] CERAMIC PRECOMBUSTION CHAMBER CONSTRUCTION OF INTERNAL COMBUSTION ENGINE

[75] Inventors: Takayuki Ogasawara, Nagoya; Akinori Wakasa, Aki; Hideki Hosokawa, Nagoya; Minoru Machida, Nagoya; Itsuo Kondo, Nagoya, all of Japan

[73] Assignee: NGK Insulators, Ltd., Nagoya, Japan

[21] Appl. No.: 103,460

[22] Filed: Oct. 1, 1987

[30] Foreign Application Priority Data

Oct. 8, 1986 [JP] Japan .......................... 61-154557[U]
Jul. 4, 1987 [JP] Japan .......................... 62-103159[U]

[51] Int. Cl.⁴ .......................................... F02B 19/16
[52] U.S. Cl. .................................................. 123/271
[58] Field of Search ............... 123/270, 271, 272, 668, 123/669

[56] References Cited

U.S. PATENT DOCUMENTS 4,616,611 10/1986 Ogawa et al. ................... 123/271 X
4,651,692 3/1987 Morita et al. .................... 123/271 X

FOREIGN PATENT DOCUMENTS

0162721 9/1983 Japan .................................. 123/270
0188025 10/1984 Japan .................................. 123/271
0010418 1/1987 Japan .................................. 123/270
1534761 12/1978 United Kingdom ............... 123/271

Primary Examiner—Willis R. Wolfe
Attorney, Agent, or Firm—Parkhurst, Oliff & Berridge

[57] ABSTRACT

A ceramic precombustion chamber construction of an internal combustion engine includes at least one ceramic body having a circular cross-section, a metal ring in which the ceramic body is fixed by shrinkage fitting, and at least one key interposed between the ceramic body and the metal ring for preventing rotation therebetween. Contour lines of a key receiving notch formed in an inner circumference of the metal ring are positioned on inner sides of contour lines of a key receiving notch formed in an outer circumference of the ceramic body. With the arrangement, the ceramic body is prevented from loosening from the fitting with the metal ring due to heat and vibration in use and is prevented from being damaged resulting from cracks occurring in the ceramic body.

3 Claims, 8 Drawing Sheets

FIG_3
PRIOR ART

FIG_4
PRIOR ART

FIG_5

FIG_6
PRIOR ART

FIG_7
PRIOR ART

FIG_8

FIG_9

FIG_10

FIG_11

FIG.12

FIG_13

FIG_14

4,809,654

CERAMIC PRECOMBUSTION CHAMBER CONSTRUCTION OF INTERNAL COMBUSTION ENGINE

BACKGROUND OF THE INVENTION

This invention relates to an improvement of a ceramic precombustion chamber construction for an internal combustion engine, and more particularly to a ceramic precombustion chamber construction fixed by a metal ring fitted thereon.

It has been known in the art to form a precombustion chamber for an internal combustion engine such as a diesel engine by a ceramic material to improve its heat-resistance and thermal efficiency. Such a ceramic precombustion chamber construction has been disclosed, for example, in U.S. Pat. No. 4,616,611 (European Patent Application Publication No. 186,943).

Figure 1:
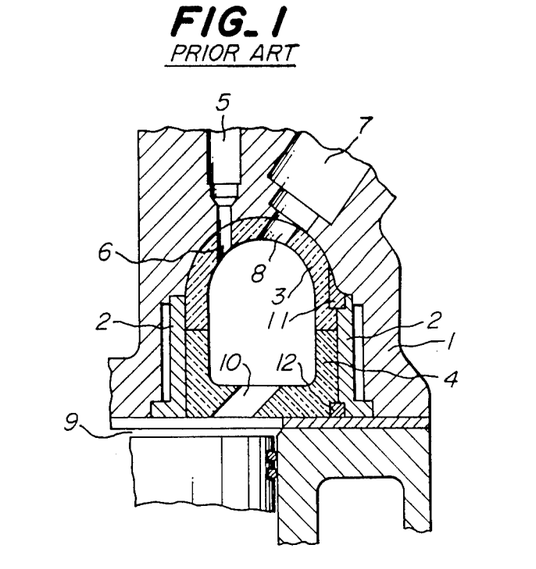
FIG. 1 is a sectional view of a precombustion chamber of the prior art.

FIG. 1 illustrates the ceramic precombustion chamber construction for an internal combustion engine disclosed in the U.S. Pat. No. 4,616,611. The ceramic precombustion chamber construction comprises a metal ring 2 press-fitted in a cylinder head 1, and ceramic bodies 3 and 4 fixed in the metal ring 2 through thermal shrinkage fitting. The ceramic bodies 3 and 4 are hollow bodies having circular cross-sections to form the precombustion chamber. The upper ceramic body 3 is formed with a through-aperture 6 communicating with a glow-plug receiving portion 5 in a cylinder head 1 and a fuel injection aperture 8 communicating with a fuel injection nozzle receiving portion 7 in the cylinder head 1. On the other hand, the lower ceramic body 4 is formed with an injection aperture 10 for injecting a fuel gas into a cylinder chamber 9. The ceramic bodies 3 and 4 are prevented from rotating by using keys 11 and 12 located in notches formed in outer surfaces of the precombustion chambers 3 and 4 and in an inner surface of the metal ring 2 as shown in FIG. 1.

However, with such a ceramic precombustion chamber construction, large tensile stresses occur in the ceramic chambers near the peripheries of the keys thus often causing cracks in the ceramic chambers.

Figure 2:
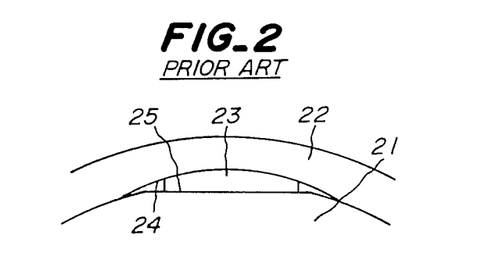
FIG. 2 is a schematic plan view of a rotation preventing key for a ceramic precombustion chamber of the prior art.
Figure 3:
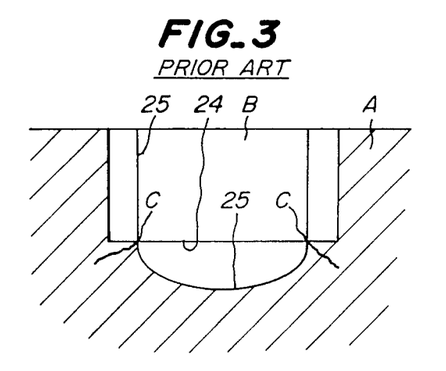
FIG. 3 is a front elevation illustrating a relation of contour lines of key receiving notches shown in FIG. 2.
Figure 4:
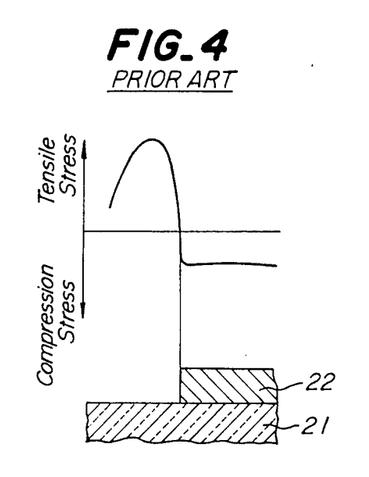
FIG. 4 illustrates stresses acting upon the ceramic body at portions C in FIG. 3.

The reason why the cracks occur will be considered in more detail referring to FIGS. 2-4. A hatched portion A in FIG. 3 is subjected to the thermal shrinkage pressure between the ceramic body 21 and the metal ring 22, while a portion B in FIG. 3 is not subjected to the thermal shrinkage pressure because it is notched for receiving the key 23. On the other hand, a stress concentration occurs in an edge portion C between the portions A and B to often cause cracks in the ceramic body.

Figure 6:
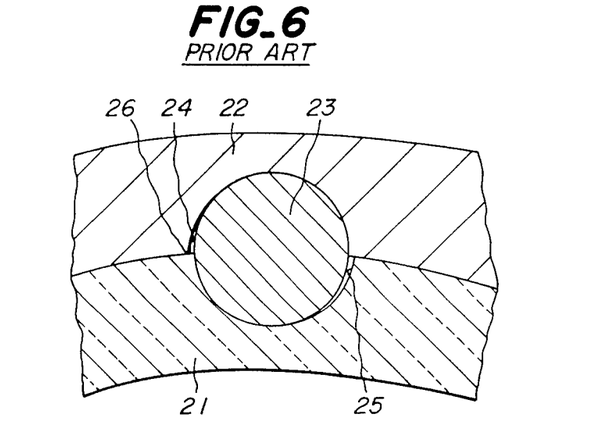
FIG. 6 is a plan view illustrating a key and key receiving notches of the prior art for preventing the ceramic body from rotating relative to a metal ring.
Figure 7:
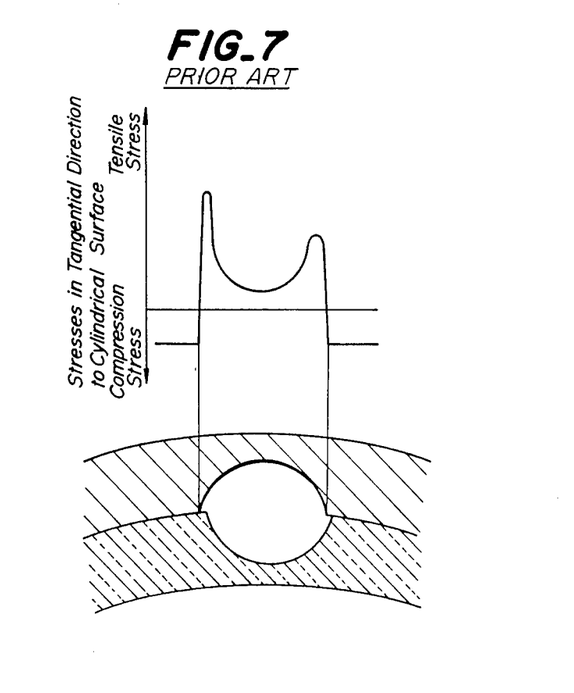
FIG. 7 illustrates a stress distribution acting upon a ceramic precombustion chamber of the prior art.

Moreover, as shown in FIGS. 6 and 7 the worked accuracy of the notches for receiving the keys is not always sufficient and a tensile stress concentration occurs at an edge 26 of the ceramic body 21 in contact with the metal ring 22 to cause cracks in the ceramic body.

The inventors of the present application have investigated the cause of cracks in ceramic precombustion chambers of the prior art and have discovered the following problems when using conventionally shaped keys as shown in FIG. 6.

It is desired to make key ways 24 and 25 formed in the metal ring 22 and the ceramic body 21 coincident with an outer circumferential shape of a key 23. However, as working methods for a ceramic material and a metal are different due to the difference in material, it is very difficult to obtain a sufficient accuracy in key ways when the metal ring and the ceramic body are assembled. A slight error in worked portions causes a positional difference in key ways as shown in FIG. 6 on an exaggerated scale. When edges 26 of the key way 24 of the metal ring 22 are positioned on a surface of the ceramic body 21, large tensile stresses occur on surfaces of the ceramic body 21 in the proximity of the edges 26 to cause cracks in the ceramic body 21.

SUMMARY OF THE INVENTION

It is a principal object of the present invention to provide an improved ceramic precombustion chamber structure for an internal combustion engine, which solves all the problems of the prior art and eliminates cracks caused by stress concentrations in the ceramic bodies fixed in a metal ring through thermal shrinkage fitting.

In order to achieve this object, in a ceramic precombustion chamber construction for an internal combustion engine including at least one ceramic body having a circular cross-section, a metal ring in which said ceramic body is fixed by shrinkage fitting, and at least one key interposed between the ceramic body and the metal ring for preventing rotation therebetween, according to the invention contour lines of a key receiving notch formed in an inner circumference of said metal ring are positioned on inner sides of contour lines of a key receiving notch formed in an outer circumference of said ceramic body.

In a preferred embodiment of the invention the key has portions to be fitted in the key receiving notches, and a width of the portion of the key to be fitted in the key receiving notch of the ceramic body is wider than a width of the portion of the key to be fitted in the key receiving notch of the metal ring.

The invention will be more fully understood by referring to the following detailed specification and claims taken in connection with the appended drawings.

DESCRIPTION OF THE PREFERRED EMBODIMENTS

Figure 8:
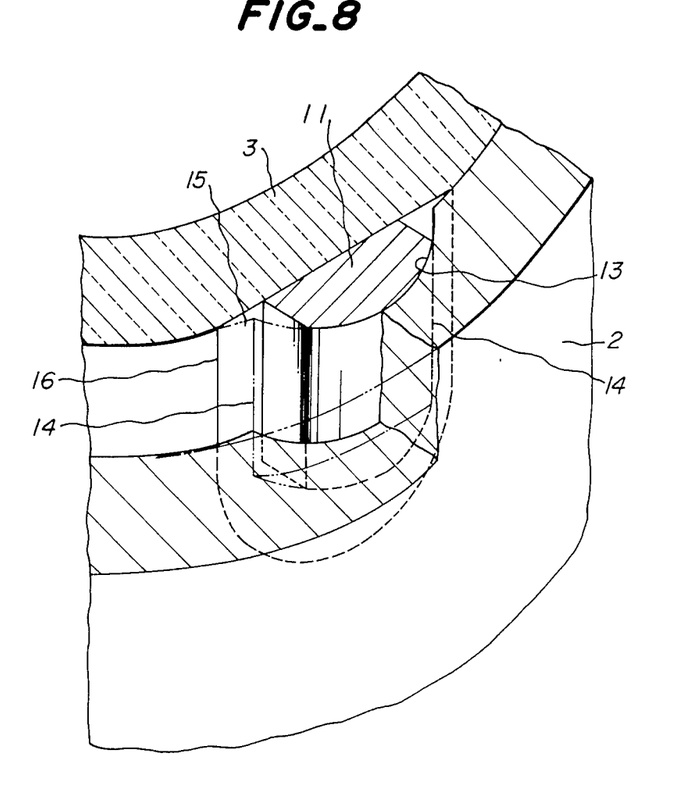
FIG. 8 is a perspective view of a rotation preventing key structure of a first embodiment of the invention.
Figure 9:
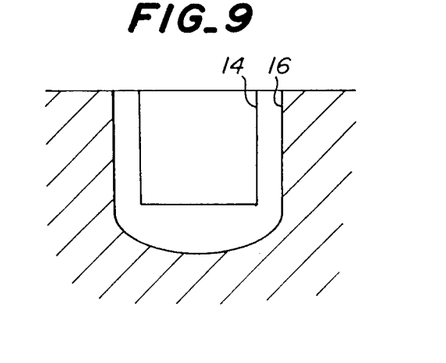
FIG. 9 is a front elevation illustrating a relation between contour lines of the ceramic body and the metal ring of the first embodiment of the invention.

FIG. 8 illustrates a preferred embodiment of the invention, wherein like components are designated by the same reference numerals as those in FIG. 1. As shown in FIG. 8, according to the invention, contour lines 14 of a key receiving notch 13 arcuately formed in an inner circumference of a metal ring 2 are positioned on inner sides of contour lines 16 of a key receiving notch 15 formed in an outer circumference of a ceramic body 3 by flatly notching the outer circumference. This positional relation is schematically shown in FIG. 9. FIG. 8 illustrates the relation between the upper ceramic body 3 and the metal ring 2 with the key 11 interposed therebetween. The same construction as shown in FIG. 8 is employed for the lower ceramic body 4 and a key 12.

Figure 10:
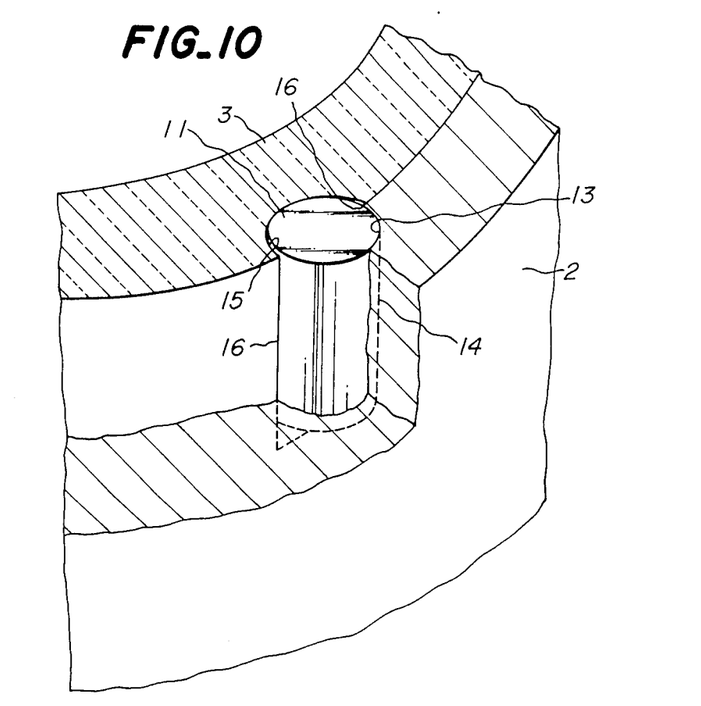
FIG. 10 is a perspective view partially removed of a rotation preventing structure of a second embodiment of the invention.
Figure 11:
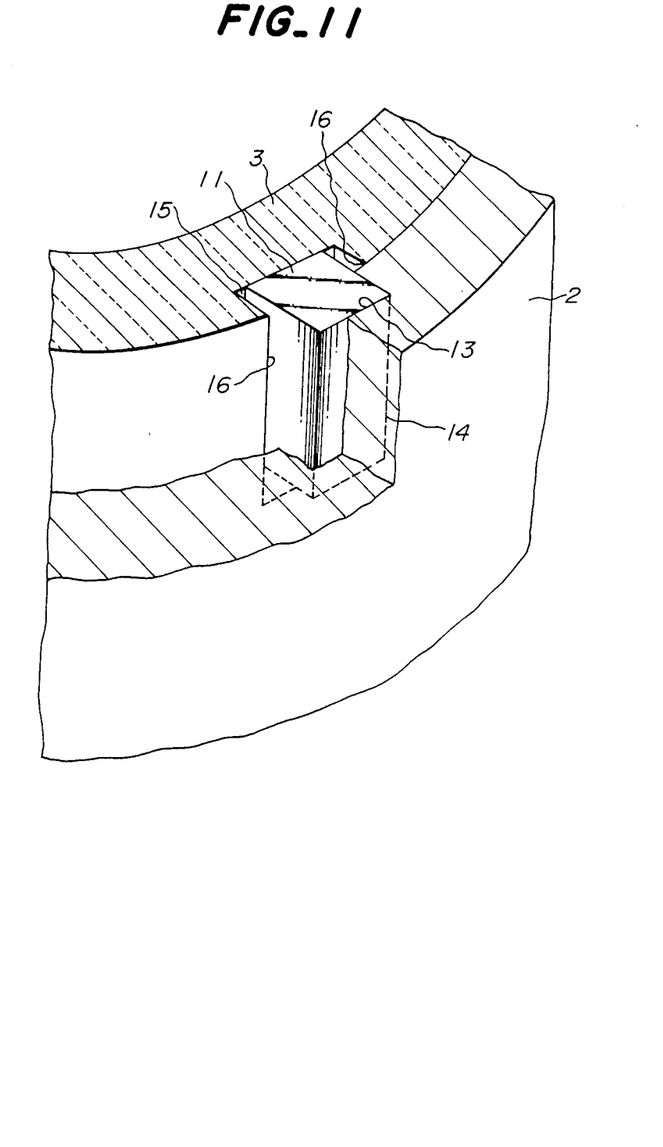
FIG. 11 is a perspective view partially removed of a rotation preventing structure of a third embodiment of the invention.

Although the key has been explained in the form having a flat surface on one side and a half cylindrical surface on the other side, it may be a column-shaped pin 11 as shown in FIG. 10 or a square column-shaped pin 11 as shown in FIG. 11. In any case, contour lines 14 of the metal ring 2 are positioned on inner sides of contour lines 16 of ceramic bodies 3 and 4.

Figure 12:
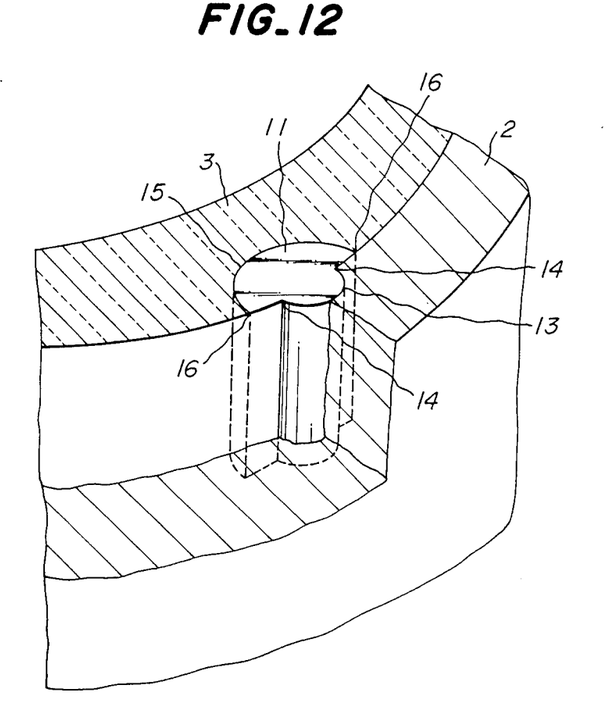
FIG. 12 is a perspective view partially removed of a rotation preventing structure of a fourth embodiment of the invention.

Moreover, as shown in FIG. 12, the key may be so constructed that a portion fitted in a ceramic body 3 has a width wider than that of a portion fitted in a metal ring 2 to more effectively prevent the relative rotation of the ceramic body 3 to the metal ring 2.

Although the key has the portions having semicircular sections in FIG. 12, these portions may have square or semielliptical cross-sections. According to the invention, the edges 16 of the key receiving notches 15 formed in the ceramic body 3 are located on outer sides of the edges 14 of the key receiving notches 13 formed in the metal ring 2, no matter what cross-sections of the key are used.

Figure 14:
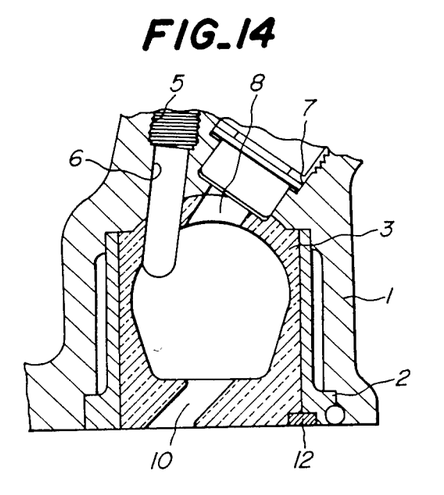
FIG. 14 is a sectional view illustrating a ceramic precombustion chamber of a fifth embodiment of the invention.

Moreover, although the ceramic bodies 3 and 4 have been explained divided in upper and lower bodies in the above embodiments, it is of course within the scope of the present invention that to a unitary ceramic body formed by a single piece as shown in FIG. 14 can be utilized.

With this arrangement, the ceramic bodies 3 and 4 are fixed in the metal ring 2 by thermal shrinkage fitting and are held against rotation by means of the keys 11 and 12, so that even if the ceramic bodies are subjected to heat and vibration, the ceramic bodies are prevented from loosening from the fitting with the metal ring. More particularly according to the invention, the contour lines 14 of the key receiving notch 13 formed in the inner circumferential surface of the metal ring 2 are arranged on inner sides of the contour lines 16 of the key receiving notch 15 formed in the outer circumferential surfaces of the ceramic bodies 3 and 4. As a result, both the contour lines do not intersect with each other so that edges causing any stress concentrations are eliminated. Moreover, portions of the metal ring 2 overhang beyond edges of the ceramic body 3 or 4 in contact with the metal ring 2, so that stress concentration which would occur in the proximities of the edges of the ceramic body are mitigated.

Figure 5:
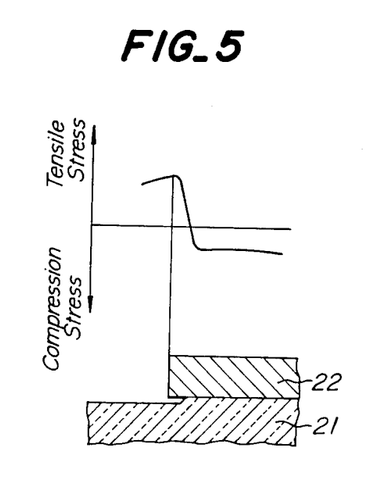
FIG. 5 illustrates a stress distribution when worked accuracies at key receiving notches are insufficient to provide an over hanged condition.

The term "overhang" used herein means the feature of extending an end of the metal ring from the contact portion (surface on which the thermal shrinkage pressure acts) between the metal ring and the ceramic body. The feature in FIG. 5 will help the understanding of the "overhang". With such a construction, the tensile stress occurring in ceramic body is considerably reduced in comparison with the construction shown in FIG. 4.

If the contour lines 14 of the metal ring 2 are arranged on outer sides of the contour lines 16 of the ceramic body 3, portions of the ceramic body 3 extend from the ends of the contact portion between the metal ring 2 and the ceramic body 3. In this case, large tensile stresses are caused in the ceramic body 3 on the outer side of the contact portion in the same manner as in the prior art shown in FIG. 4.

Figure 13:
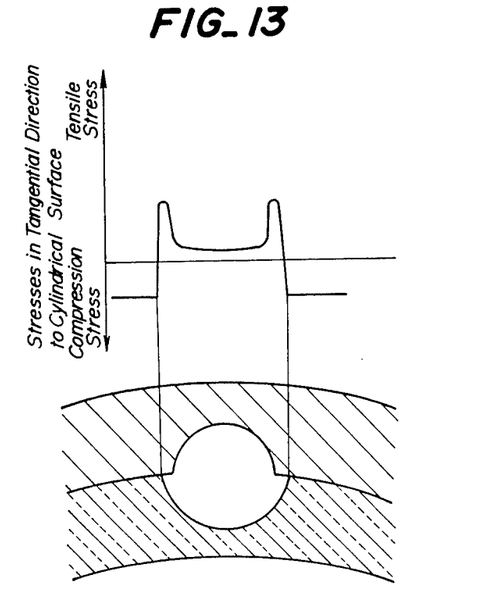
FIG. 13 illustrates a stress distribution in a ceramic body in the embodiment shown in FIG. 12.

Moreover, so long as the key has the portion to be fitted in the ceramic bodies 3 and 4 having the width wider than the width of the portion to be fitted in the metal ring 2, the edges 14 of the metal ring 2 are always located on inner sides of the edges 16 of the ceramic bodies 3 and 4 even if there are slight dimensional errors between the keys 11 and 12 and the key receiving notches 13 and 15. In this case, stress distributions in the proximities of the edges 16 are similar as shown in FIG. 13 to those of the case that portions of the metal ring overhang the ceramic bodies. Therefore, the stress concentration is mitigated and maximum values of the tensile stress are much lower than in the prior art shown in FIG. 7. Therefore, according to the invention, cracks which would otherwise occur in the ceramic bodies 3 and 4 in the proximity of the keys 11 and 12 are considerably reduced.

As can be seen from the above explanation, according to the invention, in order to mitigate tensile stress concentrations occurring in ceramic bodies, the contour lines of key receiving notches formed in the metal ring are located on inner sides of the contour lines of key receiving notches formed in the ceramic bodies and the key has the portion to be fitted in the ceramic bodies having a width wider than the width of the portion to be fitted in the metal ring. Therefore, the invention can prevent the ceramic bodies from loosening from the fitting with the metal ring due to the heat and vibration in use and prevent the ceramic bodies from being damaged resulting from cracks occurring in the ceramic bodies, thereby greatly improving the reliability of an internal combustion engine having a ceramic precombustion chamber.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A ceramic precombustion chamber for an internal combustion engine, comprising:
   at least one ceramic body having a substantially circular cross-section and having a longitudinal key receiving notch formed in an outer circumferential surface thereof;

an annular metal ring fixed through shrinkage fitting to at least a portion of the outer circumferential surface of said at least one ceramic body which includes the longitudinal key receiving notch, said annular metal ring having a longitudinal key receiving notch formed in an inner circumferential surface thereof at a location in substantial alignment with that of the key receiving notch formed in the at least one ceramic body; and at least one key inserted in the aligned key receiving notches for preventing rotation between the at least one ceramic body and the metal ring;

wherein an entire outer edge defining the contour lines of the key receiving notch formed in the inner circumferential surface of the metal ring is positioned within an entire outer edge defining the contour lines of the key receiving notch formed in the outer circumferential surface of the at least one ceramic body.

2. A ceramic precombustion chamber according to claim 1, wherein said key has a cross-section selected from the group consisting of semi-circular, semi-elliptical, circular, square and combinations thereof.

3. A ceramic precombustion chamber for an internal combustion engine, comprising:

at least one ceramic body having a substantially circular cross-section and having a longitudinal key receiving notch formed in an outer circumferential surface thereof;

an annular metal ring fixed through shrinkage fitting to at least a portion of the outer circumferential surface of said at least one ceramic body which includes the longitudinal key receiving notch, said annular metal ring having a longitudinal key receiving notch formed in an inner circumferential surface thereof at a location in substantial alignment with that of the key receiving notch formed in the at least one ceramic body; and at least one key inserted in the aligned key receiving notches for preventing rotation between the at least one ceramic body and the metal ring, said at least one key including at least two portions for fitting in the key receiving notches, said at least two portions including a first portion for fitting in the key receiving notch formed in the at least one ceramic member and a second portion for fitting in the key receiving notch formed in the metal ring, said first portion having a width wider than the width of said second portion;

wherein an entire outer edge defining the contour lines of the key receiving notch formed in the inner circumferential surface of the metal ring is positioned within an entire outer edge defining the contour lines of the key receiving notch formed in the outer circumferential surface of the at least one ceramic body.

* * * * *